UNITED STATES PATENT OFFICE.

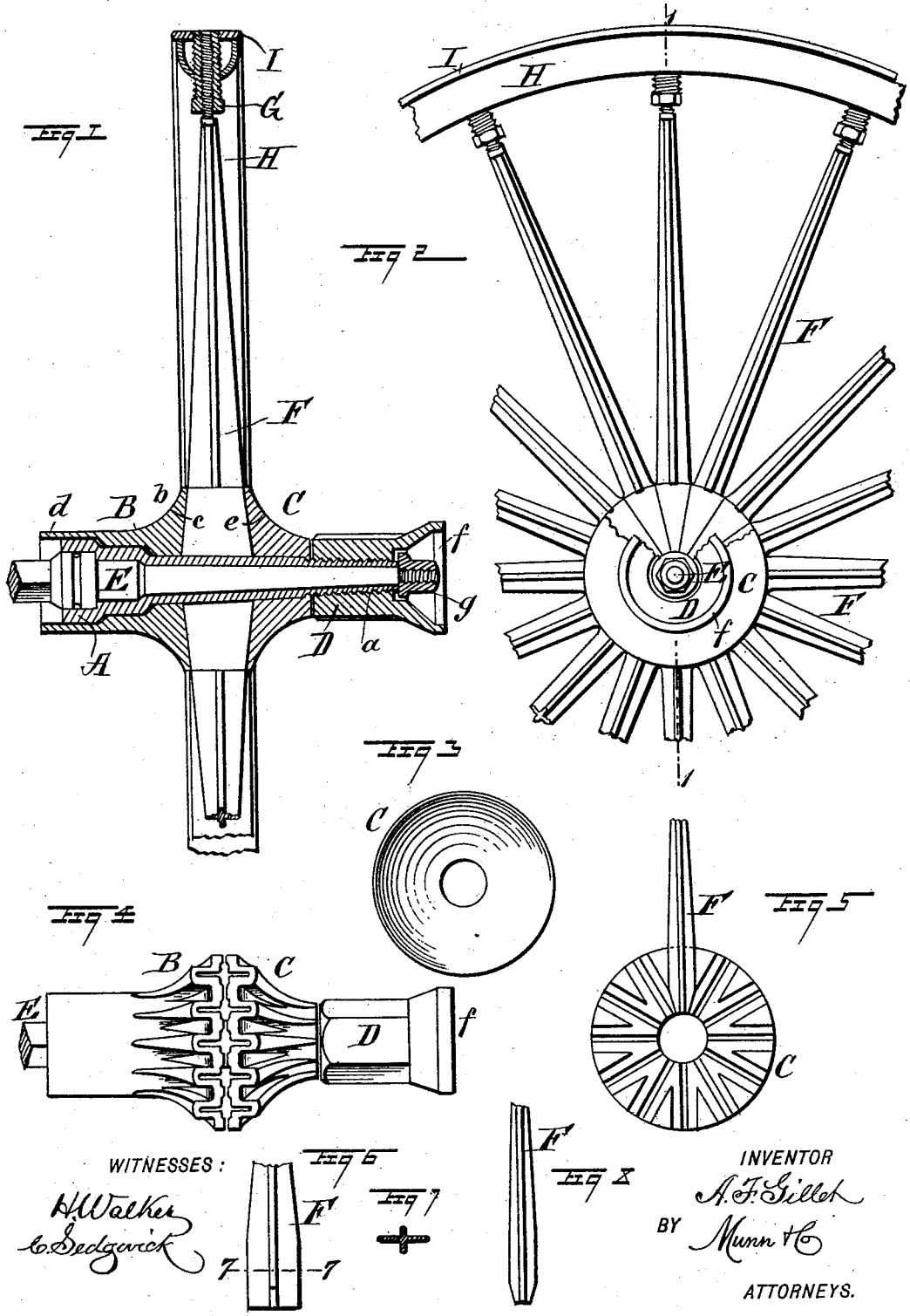

ALEXIS F. GILLET, OF KEARNEY, NEBRASKA, ASSIGNOR TO HIMSELF, GEORGE W. WHITEAKER, AND JAMES D. WHITEAKER, OF SAME PLACE.

VEHICLE-WHEEL.

SPECIFICATION forming part of Letters Patent No. 489,300, dated January 3, 1893.

Application filed March 24, 1892. Serial No. 426,275. (No model.)

*To all whom it may concern:*

Be it known that I, ALEXIS F. GILLET, of Kearney, in the county of Buffalo and State of Nebraska, have invented a new and Improved Vehicle-Wheel, of which the following is a specification, reference being had to the annexed drawings, forming a part thereof, in which—

Figure 1 is a diametrical section of part of my improved wheel, on the line 1—1 in Fig. 2; Fig. 2 is a partial side elevation, with parts broken away to show the internal construction; Fig. 3 is a face view of one part of the metallic hub; Fig. 4 is a side elevation of a modified form of hub; Fig. 5 is a side elevation of one half of the hub; Fig. 6 is a detail view of one end of the metallic spoke; Fig. 7 is a transverse section taken on line 7—7 in Fig. 6; and Fig. 8 is a side elevation of the metallic spoke.

Similar letters of reference indicate corresponding parts in all the views.

The object of my invention is to construct a vehicle wheel wholly of metal, with tire tightening devices, also to construct a wheel which may be adapted to any ordinary axle box, thereby permitting of fitting the metallic wheel to any vehicle having axle boxes.

The invention will first be described and then specifically pointed out in the claims.

The axle box A, upon which my improved wheel is built up is of the usual form, with the exception of the screw thread $a$ formed on its outer end. To the larger end of the axle box is fitted the piece B, having a flange $b$, the said flange having a conically concaved face $c$. The piece B is provided with a sleeve $d$, which projects beyond the axle box and forms the sand box. To the axle box A, is also fitted the piece C, having the conically concaved face $e$, and to the outer or smaller end of the axle box is fitted the internally threaded sleeve D, which is made polygonal on the outside so that it will receive a wrench, and the outer end of the said sleeve is furnished with a rim $f$, which projects over the nut $g$ on the end of the axle E. The metallic spokes F are provided with widened internal ends, and conform to the space between the parts B, C. The sides of the ends of the spokes which are inserted in the hub are formed on radial lines, so that the spokes adjoin each other in the hub, and are clamped securely in their place between the parts B, C. The portion of the spoke which is outside of the hub is cross shaped in section, and the extremity of the spoke is made cylindrical in form, and screw threaded to receive a sleeve G, which is screw threaded internally and externally. The felly H, is drilled and threaded to receive the threaded sleeve G, and the tire I, which is placed on the felly is also drilled and threaded to receive the said sleeve.

The wheel is built up by inserting the spokes in the felly and tire, then placing the inner ends of the spokes in the hub against the part B, placing the part C over the inner ends of the spokes, and clamping it in place by screwing up the sleeve D. The screw thread on the end of the spoke being of a different lead from that of the sleeve G, a differential action is secured by turning the said sleeve, so that at any time after the wheel is put together the spokes can be tightened if necessary in the tire by turning the said sleeve G.

In the form shown in Figs. 4 to 8, the spokes are made of cross shaped section at the inner ends, and the flanges of the hub are made of corresponding shape, so that the cross shaped ends of the spokes will be tightly clamped by the two parts of the hub.

One of the principal advantages gained by my peculiar construction is that the wheel may be built up on an ordinary axle box, so that the axle box may be taken from a wooden wheel and my improved metal wheel substituted for it without the necessity of providing a new axle.

Having thus described my invention, I claim as new and desire to secure by Letters Patent,—

1. The combination with an ordinary tapering box or skein A having its outer end externally threaded, of the sleeve $d$ fitting and inclosing the inner end of the box or skein and provided with an integral annular spoke clamping flange on its inner end, the disk C on the tapering non-threaded portion of the box or skein in rear of its threaded portion; the adjacent faces of the flange and disk being shaped to receive the inner ends of the spokes, and the internally threaded sleeve D secured on the threaded end of the box or skein and forcing the disk C inward, substantially as set forth.

2. The combination with the rim of the wheel having an internally and externally threaded sleeve; one of said threads being right and the other left hand, of a spoke having its outer end threaded and entering the sleeve, whereby by turning the sleeve the spoke and rim will be drawn together or forced apart, substantially as set forth.

3. A wheel, comprising a hub, a series of spokes threaded at their outer ends, a felly and tire, a series of tubular externally and internally threaded sleeves screwed into the felly and tire and screwed upon the outer ends of the spokes; the threads of the sleeve being right and left hand respectively, substantially as set forth.

ALEXIS F. GILLET.

Witnesses:
J. D. WHITEAKER,
G. W. WHITEAKER.